Jan. 15, 1929.

J. W. COX 1,698,716

ICE CREAM DISHER

Filed Nov. 12, 1926

Inventor
John W. Cox
By Fred Gerlach
his Atty

Patented Jan. 15, 1929.

1,698,716

UNITED STATES PATENT OFFICE.

JOHN W. COX, OF ERIE, PENNSYLVANIA, ASSIGNOR TO THE GILCHRIST COMPANY, OF NEWARK, NEW JERSEY, A CORPORATION OF NEW JERSEY.

ICE-CREAM DISHER.

Application filed November 12, 1926. Serial No. 147,868.

The invention relates to ice-cream dishers and its object is to provide a device in which the necessity of providing a scraper for severing the ice-cream from the bowl is dispensed with. This object is attained primarily by providing a diaphragm in the bowl which receives the ice-cream which is adapted to be operated by fluid under pressure to expel the ice-cream from the bowl.

The invention consists in the several novel features hereinafter set forth and more particularly defined by claims at the conclusion hereof.

Figure 1:
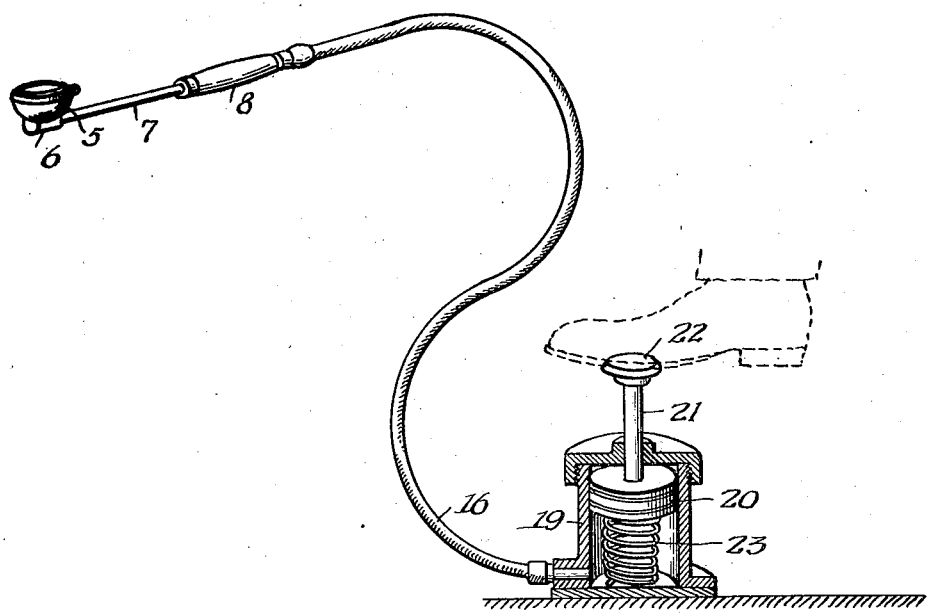
Figure 2:
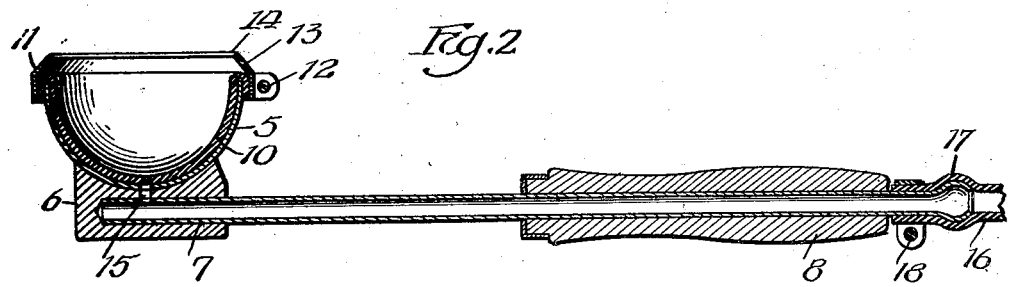
Figure 3:
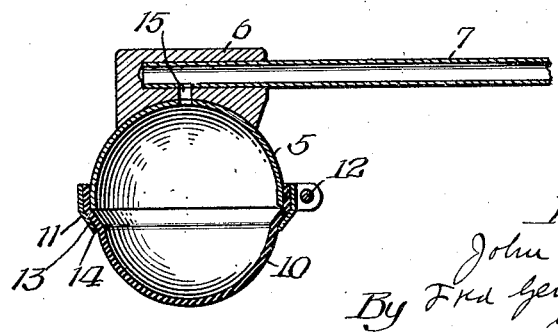

In the drawing: Fig. 1 is a perspective of a device embodying the invention. Fig 2 is a longitudinal section of the disher. Fig. 3 is a similar view, the diaphragm being shown in position it assumes when it has expelled the ice-cream from the bowl.

The invention is exemplified in a device comprising a hemispherical metal bowl 5 of suitable size to receive ice-cream in the desired quantity in which it is to be served. The apex or bottom of the bowl is fixedly secured to a block or stem 6. A tube 7 is extended into the block 6 and fixedly secured therein. A handle 8 is secured on the tube 7 some distance from the bowl, so that the disher may be manipulated into an ice-cream can when it is to be filled and inverted over a receptacle when the ice-cream is to be discharged. An elastic diaphragm 10 fits in and conforms substantially to the inner periphery of the bowl 5 and its margin is lapped around the margin of the bowl and is fixedly secured thereon by a ring 11 which may be split and clamped by a screw 12, so that it will firmly secure the margin of the diaphragm to the margin of the bowl. The ring 11 is inclined upwardly and inwardly, as at 13, terminating in an edge 14 which is adapted to cut into bulk ice-cream when the disher is pushed into it to fill the bowl. This ring serves to clamp the diaphragm around the margin of the bowl to form an air-tight connection between the diaphragm and the bowl.

Tube 7 serves as a conductor for air under pressure to shift the diaphragm 10 to expel the ice-cream from the bowl. A duct 15 leads from the tube 7 to the inner face of the bowl 5 to conduct air under pressure between the bowl 5 and the diaphragm 10. A flexible tube or hose 16 has one of its ends connected at 17 to the rear end of the tube 7, being secured thereon by a suitable hose clamp 18. The other end of the tube 16 is connected to a pump-cylinder 19 which is adapted to rest on the floor or any convenient place within convenient access of the dispenser. A piston 20 is slidable in the cylinder 19 and is secured to a stem 21, the upper end of which is provided with a foot-piece 22. A spring 23 is interposed between the piston 20 and the bottom of the cylinder to automatically retract the piston when it is released. Piston 20 is double-acting in that it is adapted to compress the air in the cylinder 19 and force it through the tubes 16 and 7 into the bowl 5 and during its retractile stroke to draw the air out of the bowl back into the cylinder.

In operation, the dispenser will dip the disher into bulk ice-cream to fill the bowl and withdraw it from the can. When the disher has been manipulated into position above a receptacle onto which the ice-cream is to be discharged, the dispenser will step on the foot-piece 22 to operate the piston 20. The piston will compress the air in the cylinder 19 and force air under pressure through the flexible hose 16, tube 7, and duct 15, into the space between the bowl 5 and the flexible diaphragm 10. The air under pressure will force the diaphragm outwardly until it has expelled the ice-cream from the bowl and until it reaches approximately the position indicated in Fig. 3. After depressing the foot-piece 22, the dispenser will release it, whereupon the air pressure in the cylinder and the spring 23 will retract the piston 20 to draw the air from the bowl 5 and to restore the diaphragm into the normal position shown in Fig. 2.

The invention exemplifies an ice-cream disher in which the bowl is provided with a diaphragm that is operable by a fluid under pressure to forcibly eject the ice-cream from the bowl. The disher is simple in construction and can be produced at a low cost. The device for alternately producing suction and pressure to operate the diaphragm may be conveniently operated by a foot of the dispenser.

The invention is not to be understood as restricted to the details set forth, since these may be modified within the scope of the appended claims, without departing from the spirit and scope of the invention.

Having thus described the invention, what

I claim as new and desire to secure by Letters Patent, is:

1. In an ice-cream disher, the combination of a bowl, a handle connected to the bowl and whereby it may be manipulated, a flexible diaphragm in the bowl, and means for shifting the diaphragm to expel the ice-cream from the bowl.

2. In an ice-cream disher, the combination of a bowl, a handle connected to the bowl and whereby it may be manipulated, a flexible diaphragm in the bowl, and means for delivering fluid under pressure to shift the diaphragm to expel the ice-cream from the bowl.

3. In an ice-cream disher, the combination of a hemispherical bowl, a handle connected to the bowl and whereby it may be manipulated, a flexible diaphragm fitting the inner periphery of the bowl, and means for delivering fluid under pressure to shift the diaphragm to expel the ice-cream from the bowl.

4. In an ice-cream disher, the combination of a bowl, a handle connected to the bowl, and whereby it may be manipulated, a diaphragm in the bowl, and means for alternately delivering fluid under pressure to shift the diaphragm to expel the ice-cream from the bowl and for exhausting the fluid to retract the diaphragm.

5. In an ice-cream disher, the combination of a bowl, a handle connected to the bowl, and whereby it may be manipulated, a flexible diaphragm in the bowl, and means for shifting the diaphragm to expel the ice-cream from the bowl and for retracting the diaphragm.

6. In an ice-cream disher, the combination of a bowl, a handle connected to the bowl, and whereby it may be manipulated, a flexible diaphragm in the bowl, and means for alternately delivering fluid under pressure to shift the diaphragm to expel the ice-cream from the bowl and for exhausting the fluid to retract the diaphragm.

7. In an ice-cream disher, the combination of a hemispherical bowl, a handle connected to the bowl, and whereby it may be manipulated, a flexible diaphragm fitting the inner periphery of the bowl, and means for alternately delivering fluid under pressure to shift the diaphragm to expel the ice-cream from the bowl and to retract the diaphragm into the bowl.

8. In an ice-cream disher, the combination of a bowl, a diaphragm fitting in the bowl, a tube connected to the bowl, for conducting fluid under pressure to and from the diaphragm, a handle, and means for supplying fluid under pressure to and exhausting it from the tube, to operate the diaphragm.

9. In an ice-cream disher, the combination of a bowl, a diaphragm fitting in the bowl, a tube connected to the bowl, for conducting fluid under pressure to and from the diaphragm, a handle, a pump for supplying fluid under pressure to and exhausting it from the tube to operate the diaphragm, and a flexible connection between the tube and the pump.

10. In an ice-cream disher, the combination of a bowl, a diaphragm fitting in the bowl, a ring for clamping the margin of the diaphragm to the rim of the bowl, a tube connected to the bowl, for conducting fluid under pressure to and from the diaphragm, a handle, and means for supplying fluid under pressure to and exhausting it from the tube, to operate the diaphragm.

11. In an ice-cream disher, the combination of a hemispherical bowl, a diaphragm fitting in the bowl, a clamping ring for securing the margin of the diaphragm to the rim of the bowl, a tube connected to the bowl, for conducting fluid under pressure to and from the diaphragm, a handle on the tube, a pump supplying fluid under pressure to and exhausting it from the tube to operate the diaphragm, and a flexible connection between the tube and the pump.

Signed at Erie, Pennsylvania, this 4th day of November, 1926.

JOHN W. COX.